United States Patent [19]

Bracken et al.

[11] Patent Number: 5,055,014
[45] Date of Patent: Oct. 8, 1991

[54] FLUID SUPPLY CONDUIT

[75] Inventors: Robert L. Bracken, Rockford; Anita I. Jacobs, Roscoe, both of Ill.

[73] Assignee: Sundstrand Corporation, Rockford, Ill.

[21] Appl. No.: 544,410

[22] Filed: Jun. 27, 1990

[51] Int. Cl.⁵ .............................................. F04B 39/00
[52] U.S. Cl. ....................................... 417/572; 138/37; 138/39
[58] Field of Search .................... 417/572; 138/37, 39; 285/177; 60/734; 415/182.1, 183

[56] References Cited

U.S. PATENT DOCUMENTS

| | | | |
|---|---|---|---|
| 1,333,142 | 3/1920 | Ulmer | 138/37 |
| 3,191,630 | 6/1965 | Demyan | 138/42 |
| 3,494,296 | 2/1970 | Gluntz | 310/328 |
| 4,098,251 | 7/1978 | Scott | 123/195 A |
| 4,280,360 | 7/1981 | Kobayashi et al. | 73/198 |
| 4,281,964 | 8/1981 | Jinkins | 415/203 |
| 4,536,139 | 8/1985 | Greco et al. | 417/471 |
| 4,784,185 | 11/1988 | Friedrichs | 138/109 |
| 4,787,421 | 11/1988 | Yu | 138/178 |
| 4,809,743 | 3/1989 | Sukimoto et al. | 137/561 A |
| 4,880,352 | 11/1989 | Aarestad | 415/182.1 |

Primary Examiner—Leonard E. Smith
Assistant Examiner—Charles Freay
Attorney, Agent, or Firm—Marshall, O'Toole, Gerstein, Murray & Bicknell

[57] ABSTRACT

Prior fuel supply conduits for use in applications where fluid flow must diffuse and turn a sharp bend have suffered from reduced two-phase flow capability, cavitation on the walls of the conduit, head loss and unsteady flow patterns. In order to overcome these problems, a fuel supply conduit includes an inlet flow passage member having first and second ends and an inner wall defining a first, diverging passage from the first end to the second end wherein the member directs fuel flow at the first end substantially 180 degrees opposite to an axial direction and directs fuel flow at the second end in a direction transverse to the axial direction. A fuel supply chamber is disposed between the second end of the member and an inducer inlet and allows fuel flow from the member to the inducer inlet wherein the fuel supply chamber includes inner walls defining a second, converging passage from the second end of the member to the inducer inlet.

20 Claims, 4 Drawing Sheets

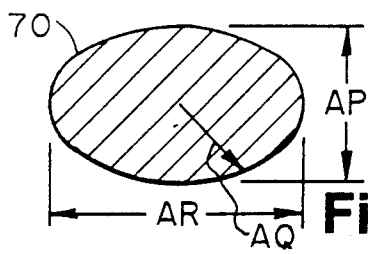
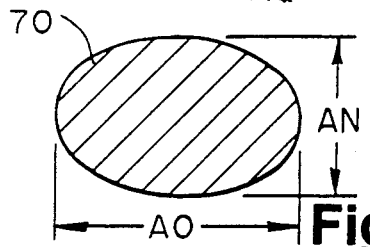
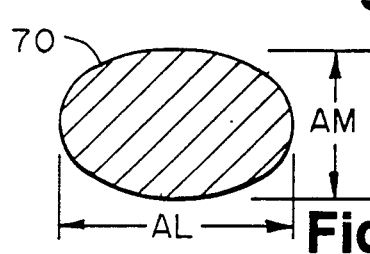
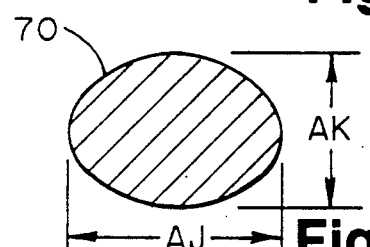
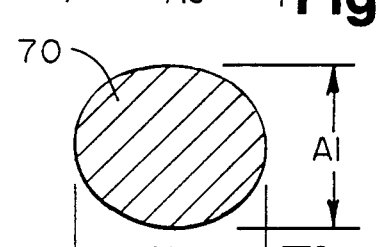
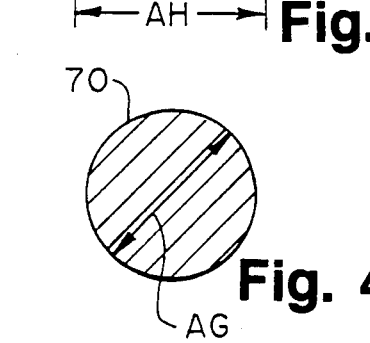
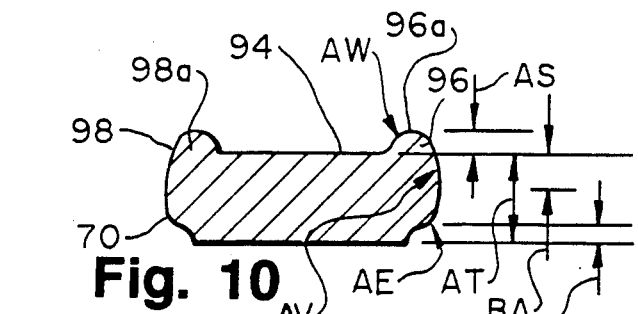
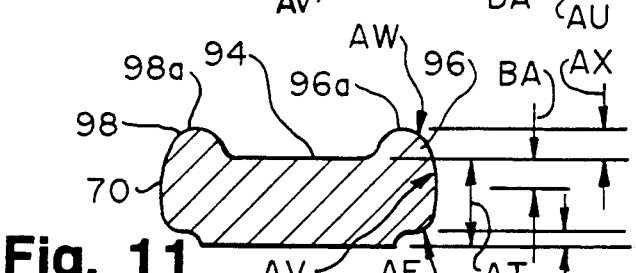
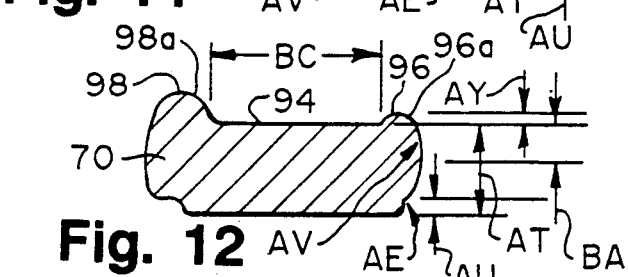
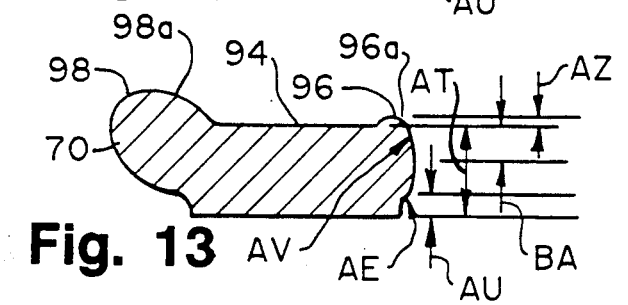
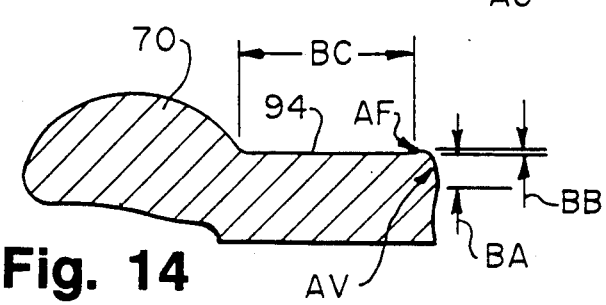

FLUID SUPPLY CONDUIT

TECHNICAL FIELD

The present invention relates generally to fluid conduits, and more particularly to a fuel supply conduit for an aircraft fuel pump.

BACKGROUND ART

Often, it is necessary to deliver fluid to a fluid utilization device which is located in cramped quarters adjacent other structures that limit the amount of space available for a conduit. One location where this problem may be encountered is in jet aircraft that typically includes a relatively large number of components packed within a confined volume of space. In one particular aircraft installation, an inducer inlet of a jet engine fuel pump is located in close proximity to other engine components, thereby resulting in a limited amount of available space for delivering fuel to the fuel pump. In this installation, a conduit having a sharp bend of limited length along the axial direction of the fuel pump is required. Further, the cross-sectional area of an inlet of the conduit is specified as being a certain size smaller than the cross-sectional area of the inducer inlet of the fuel pump. Thus, fuel must diffuse as well as turn sharply before entering the pump. Typically, pumps utilizing this type of conduit suffer from reduced two-phase flow capability, cavitation on the walls of the inlet cavity, head loss and unsteady flow patterns.

Aarestad U.S. Pat. No. 4,880,352 discloses a centrifugal liquid pump having a housing section and an impeller section. The housing section includes an intake cavity having a ramp formed therein which imparts both an axial component of motion on liquid flowing through the housing toward the impeller section as well as a radial component of motion on the liquid inwardly toward a pump axis. The ramp insures contaminants in the liquid pass with the liquid inwardly and upwardly into the impeller section.

Yu U.S. Pat. No. 4,787,421 discloses flow paths for conducting fluids. Flow bodies such as a manifold passage, a turbine scroll casting and an elbow are described wherein the flow bodies are defined in accordance with a super-elliptical equation. Some of the flow bodies include cross-sectional areas of continuously decreasing cross-sectional size along the length of the body.

Other patents disclosing the use of flow passages include Demyan U.S. Pat. No. 3,191,630, Gluntz U.S. Pat. No. 3,404,296, Scott U.S. Pat. No. 4,098,251, Kobayashi, et al U.S. Pat. No. 4,280,360, Jinkins U.S. Pat. No. 4,281,964, Greco et al U.S. Pat. No. 4,536,139, Friedrichs U.S. Pat. No. 4,784,185 and Sukimoto et al U.S. Pat. No. 4,809,743.

SUMMARY OF THE INVENTION

In accordance with the present invention, a fluid supply conduit provides fluid to a utilization device in a manner which results in improved flow.

More particularly, in accordance with a first aspect of the present invention, an improvement in a fluid supply chamber for a fluid utilization device wherein fluid is to be delivered to the device generally in a first direction and wherein the chamber includes an inlet port at which fluid flow is established in a second direction transverse to the first direction and an outlet port and wherein the flow of fluid is divided into a through-flow stream and a non-through-flow stream adjacent the outlet port comprises inner walls defining a converging flow passage disposed between the inlet port and the outlet port of the chamber. The flow passage includes a transition portion at which a component of flow in the first direction is imparted to the fluid. A vane is disposed adjacent to the outlet port of the chamber and directs fluid from the non-through-flow stream into the through-flow stream.

Preferably, the flow passage exhibits a convergence which is substantially uniform per unit meridional length of the flow passage. Also, the transition portion includes an inner wall surface of continuous curvature that directs the flow of fluid towards the fluid utilization device. Further, the fluid utilization device may include a shaft extending parallel to the first direction through the chamber and a bore in a chamber wall wherein the chamber further includes an upstanding arcuate projection extending into the chamber and surrounding the bore.

In accordance with a further aspect of the present invention, a fluid supply conduit for a fluid utilization device wherein the device includes an inlet into which fluid is to be delivered generally in an axial direction includes an inlet flow passage member having first and second ends and inner walls defining a first, diverging passage from the first end to the second end wherein the member directs fluid flow at the second end in a direction transverse to the axial direction. A fluid supply chamber is disposed between the second end of the member and the inlet of the utilization device and allows fluid flow therebetween, the fluid supply chamber including inner walls defining a second, converging passage from the second end of the member to the utilization device.

Preferably, the second passage converges in a substantially uniform manner over its length. Also, the first passage diverges in a substantially uniform manner over a portion of the length of the inlet flow passage member. Further, the chamber preferably includes an inlet port having a first cross-sectional area and an outlet port having a second cross-sectional area which is a fraction of the first cross-sectional area.

In accordance with a still further aspect of the present invention, a fuel supply conduit for an aircraft fuel pump wherein the pump includes an inducer inlet through which fluid is to be delivered generally in an axial direction and wherein the inducer inlet is spaced from an obstruction by a certain axial distance includes an inlet flow passage member having first and second ends and inner walls defining a first, diverging passage from the first end to the second end, the member directing fuel flow at the first end substantially 180 degrees opposite to the axial direction and directing fuel flow at the second end in a direction transverse to the axial direction wherein the member includes an outer axial dimension at the second end substantially equal to the certain axial distance. A fuel supply chamber is disposed between the second end of the member and the inducer inlet of the fuel pump and allows fuel flow from the member to the fuel pump wherein the fuel supply chamber includes inner walls defining a second, converging passage from the second end of the member to the fuel pump.

In a preferred form of the present invention, the second passage converges in a substantially uniform manner over its length and the first passage diverges in a substantially uniform manner over a portion of its length. Further, the fuel supply chamber includes an inner wall surface of continuous curvature which directs fuel flow towards the inducer inlet. A vane is disposed adjacent an outlet port of the chamber and directs contaminants in the fuel into a through-flow stream. Also, the first passage has a substantially circular cross-sectional shape at the first end thereof and a substantially elliptical cross-sectional shape at the second end thereof. The chamber further includes an inlet port having a first cross-sectional area and the outlet port has a second cross-sectional area which is a certain percentage of the first cross-sectional area. The chamber further includes an upstanding arcuate projection extending into the chamber surrounding a bore wherein a shaft of the fuel pump extends through the bore.

The present invention permits fluid to be delivered to a fluid utilization device in a manner which avoids the problems noted above with respect to the prior devices.

BRIEF DESCRIPTION OF THE DRAWINGS

FIG. 4 comprises a sectional view taken along the lines 4—4 of FIG. 3;

FIG. 5 comprises a sectional view taken along the lines 5—5 of FIG. 3;

FIG. 6 comprises a sectional view taken along the lines 6—6 of FIG. 3;

FIG. 7 comprises a sectional view taken along the lines 7—7 of FIG. 3;

FIG. 8 comprises a sectional view taken along the lines 8—8 of FIG. 3;

FIG. 9 comprises a sectional view taken along the lines 9—9 of FIG. 3;

FIG. 10 comprises a sectional view taken along the lines 10—10 of FIG. 2;

FIG. 11 comprises a sectional view taken along the lines 11—11 of FIG. 2;

FIG. 12 comprises a sectional view taken along the lines 12—12 of FIG. 2;

FIG. 13 comprises a sectional view taken along the lines 13—13 of FIG. 2;

FIG. 14 comprises a sectional view taken along the lines 14—14 of FIG. 2;

FIG. 15 comprises an enlarged fragmentary view of a portion of the core of FIG. 2 wherein the portion is identified by the view lines 15—15; and FIG. 16 comprises an enlarged fragmentary view of a portion of the core wherein the portion is identified by the view lines 16—16 of FIG. 2.

DESCRIPTION OF THE PREFERRED EMBODIMENTS

Figure 1:
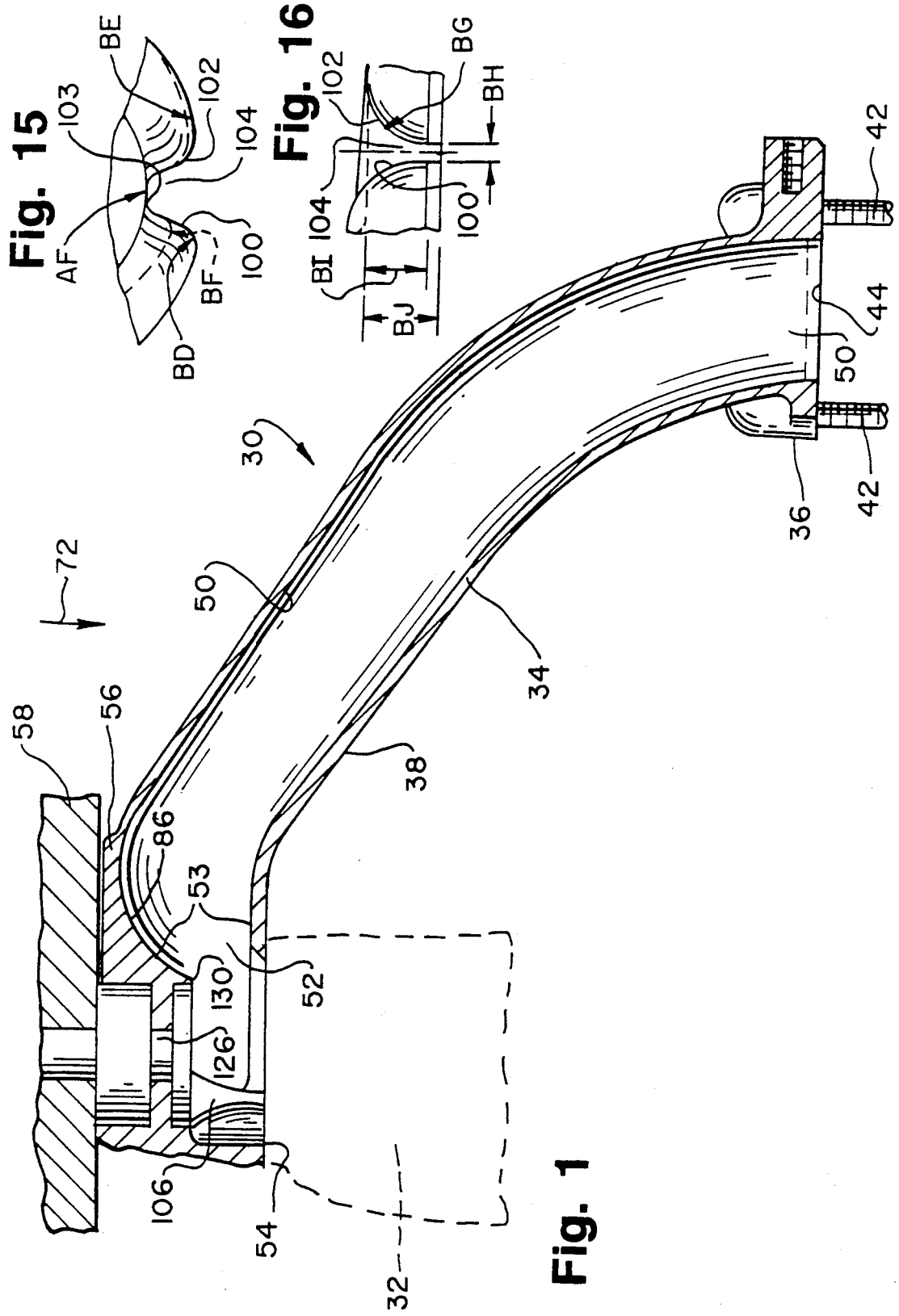
FIG. 1 comprises a sectional view of a fluid supply conduit according to the present invention.

Referring now to FIG. 1, a conduit 30 for supplying a fluid, such as aircraft jet fuel, to a fluid utilization device in the form of a fuel pump 32 (shown partially in phantom in FIG. 1) for a jet aircraft includes an inlet flow passage member 34 having a first end 36 and a second end 38. The first end 36 includes a flange 40 having bolts 42 secured therein (only two of which are visible in the figures) which in turn permit the conduit 30 to be attached to an airframe/engine interface (not shown). The airframe/engine interface includes a channel therein of a diameter substantially equal to the diameter of an inlet port 44 of the conduit 30. The inlet port 44 is circular in cross-section.

The inlet flow passage member 34 includes an inner wall 50 defining a first, diverging passage from the first end 36 to the second end 38. The flow passage member 34 directs fuel flow from the first end 36 to the second end 38 into a fuel supply chamber 52, seen in FIGS. 2 and 4. The fuel supply chamber is disposed between the second end 38 of the member 34 and an inducer inlet 54 of the fuel pump 32. The chamber allows fuel flow from the flow passage member 34 to the fuel pump 32 and, as noted in greater detail hereinafter, includes inner walls 53 defining a second, converging passage from the second end of the member 34 to the fuel pump 32.

As seen in FIG. 1, a housing 56 enclosing the chamber 52 is secured to the fuel pump 32 and adjacent an obstruction 58 (partially shown in FIG. 1). The axial distance between the inducer inlet 54 and the obstruction 58 is quite limited, thereby requiring fuel flow to be diverted substantially 180 degrees from the first end 36 of the inlet 34. The flow at the inducer inlet 54 is ideally in the axial direction into the fuel pump 32.

Figure 2:
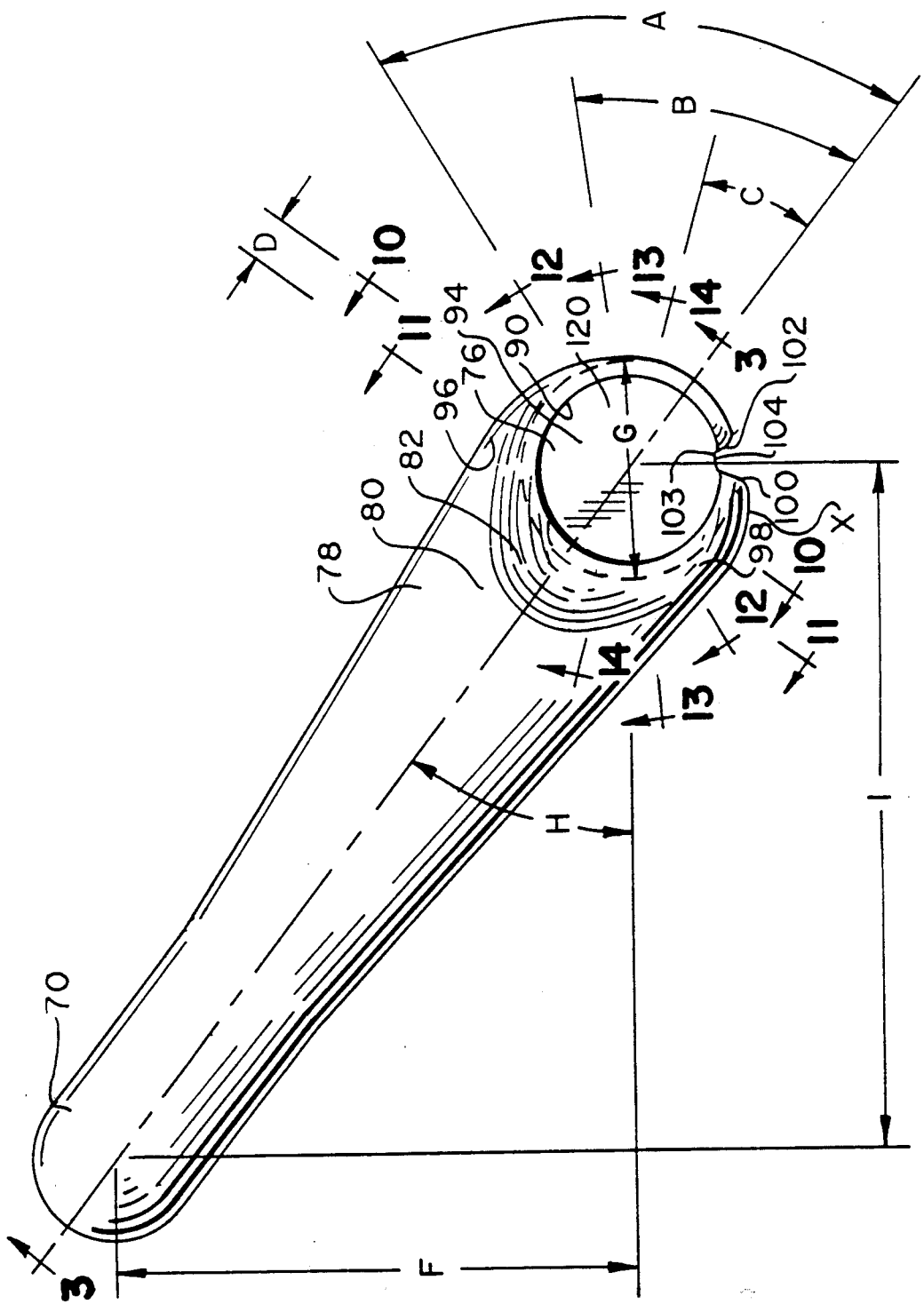
FIG. 2 comprises a side elevational view of a casting core used to form inner walls of the fluid supply conduit of FIG. 1.
Figure 3:
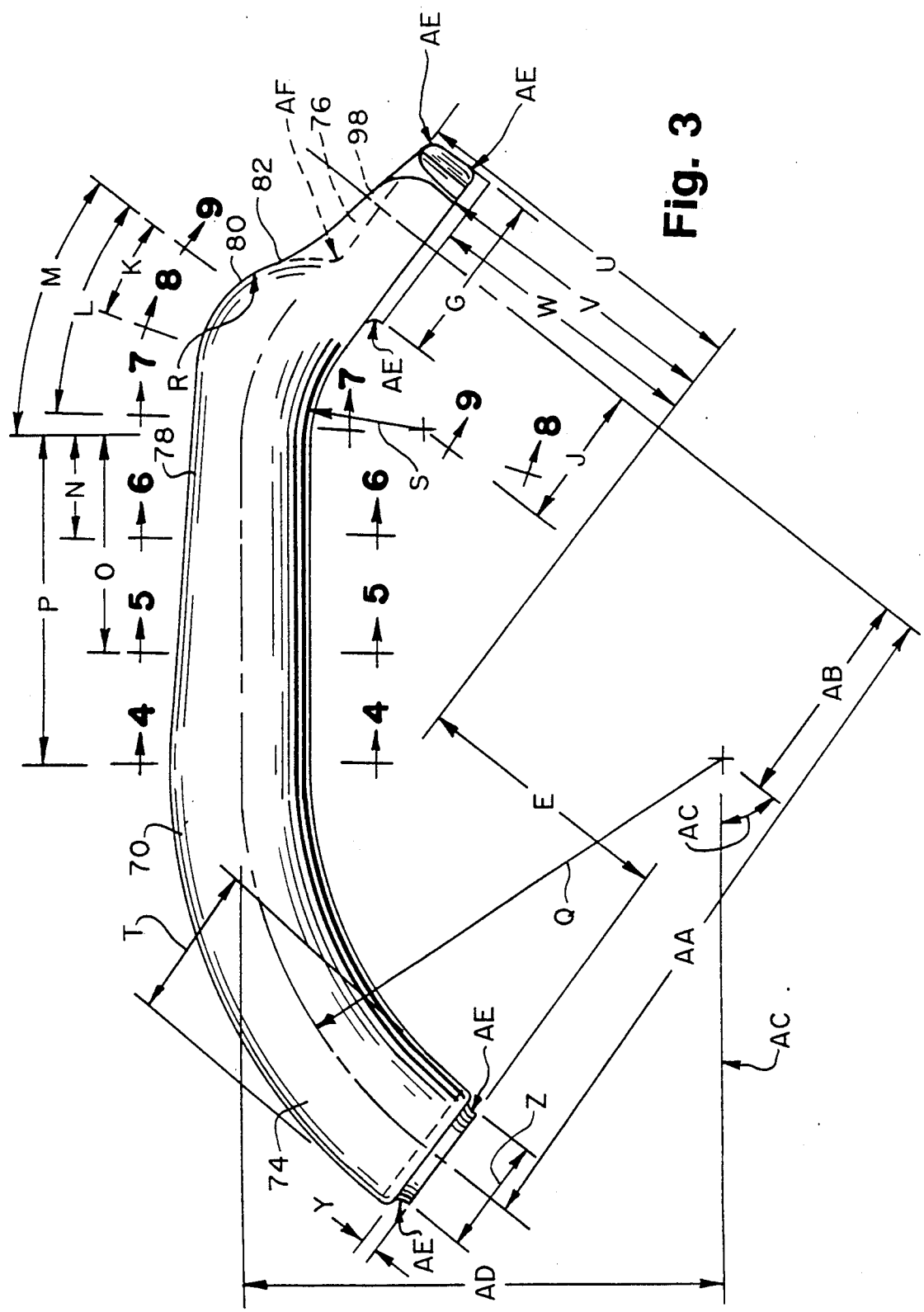
FIG. 3 comprises an elevational view of the core of FIG. 2 taken along view lines 3—3 thereof.

FIG. 2 illustrates the passage 50 and the chamber 52 in greater detail. FIGS. 3 and 4 illustrate a casting core 70 which may be used to form the first passage 50 and the chamber 52. An arrow 72 in FIG. 1 indicates the direction in which the core 70 is viewed in FIG. 2. The core 70 includes a portion 74 of substantially constant cross-sectional area of circular configuration, such cross-section being illustrated in FIG. 4.

Disposed between the portion 74 and a head portion 76 is a mid-portion 78. The mid-portion 78 has a gradually increasing cross-sectional area from the portion 74 to the head portion 76. The portion 78 includes cross-sectional areas which are elliptical or substantially elliptical in shape, as illustrated in FIGS. 5-9. It should be noted that only portions of the core 70 disposed in the section plane are visible in FIGS. 4-9 as well as FIGS. 10-14 described hereinafter. The cross-sectional area of the mid-portion 78 smoothly and continuously increases without abrupt discontinuities. The major axes of the cross-sections increase in extent and the minor axes decrease in extent from the portion 74 to the head portion 76.

The mid-portion 78 further includes a shouldered portion 80 having a curved outer surface 82. As seen in FIG. 1, the curved outer surface 82 forms a transition portion defined by an inner wall surface 86 of continuous curvature which directs the flow of fuel toward the fuel pump 32.

The head portion 76 of the core 70 includes a wall 90 defining an arcuate depression or trough 94. Disposed outwardly of the depression 94 are first and second substantially circular ramp surfaces 96, 98 that terminate at walls 100, 102 which, together with a wall 103, define a notched portion 104 illustrated in greater detail in FIGS. 15 and 16. It can be seen in FIGS. 2 and 15 that the walls 100, 102 converge toward one another. Referring again to FIG. 1, the walls 100, 102 and 103 form a vane 106 during casting of the housing 56. The vane 106 directs fuel, and more particularly contaminants present in the fuel, from a non-flow-through stream flowing in a circular direction adjacent the inducer inlet 54 into a through-flow stream flowing generally in the axial direction into the fuel pump 32. In addition, the vane 106 also assists in providing uniform fuel flow into the inducer inlet 54.

FIGS. 10-14 illustrate various sections through the head portion 76 of the core 70. FIGS. 10 and 11 illustrate that the ramp portions 96, 98 have rounded surfaces 96a, 78a which terminate at the depression 94 therebetween. During casting of the housing 56 using the core 70, the depression 94 forms a flat circular surface 122 in the chamber 52 which, as seen in FIG. 1, is machined to provide a counterbore 124. A bore or aperture 126 is formed in the center of the counterbore 124 and a fuel control shaft 128 of the fuel pump 32 extends through the bore 126. The counterbore 124 is surrounded by an upstanding arcuate projection 130 which is formed by the depression 94 of the core 70 during casting and subsequent machining of the counterbore 124.

As seen in FIGS. 12-14, the ramp portion 96 decreases in size and the ramp portion 98 increases in size with successive cross-sections in a clockwise direction as viewed in FIG. 2.

The convergence of the second passage formed by the chamber 52 is substantially uniform per unit meridional length of the passage, i.e. the cross-sectional area of the chamber decreases uniformly along the length thereof. Also, there are no abrupt or discontinuous changes in the cross-sectional area of the chamber 52 in a direction perpendicular to the flow of fuel therethrough. This, in turn, assures that fluid flow is accelerating as it enters the inducer inlet 54 for optimized performance.

Set forth below are sample dimensions of the fluid conduit of the present invention illustrated in the drawings (the reference letters identify particular dimensions in the drawings). It should be noted that the dimensions presented below are exemplary only, it being understood that the claims appended hereto are not to be interpreted as being limited thereby:

| Reference Letter | Dimension Magnitude (in inches except as otherwise noted). |
|---|---|
| A | 67 degrees, 30 minutes |
| B | 45 degrees |
| C | 22 degrees, 30 minutes |
| D | 0.354 |
| E | 2.578 |
| F | 4.156 |
| G | 1.700 diameter |
| H | 38 degrees |
| I | 5.319 |
| J | 1.400 |
| K | 17 degrees, 14 minutes |
| L | 34 degrees, 28 minutes |
| M | 37 degrees, 58 minutes |
| N | 0.986 |
| O | 2.069 |
| P | 3.153 |
| Q | 4.640 radius |
| R | 1.062 radius |
| S | 1.125 radius |
| T | 1.312 |
| U | 3.447 |
| V | 2.884 |
| W | 2.750 |
| X | 1.100 radius |
| Y | 0.125 |
| Z | 1.062 diameter |
| AA | 6.750 |

-continued

| Reference Letter | Dimension Magnitude (in inches except as otherwise noted). |
|---|---|
| AB | 2.110 |
| AC | 52 degrees 2 minutes |
| AD | 4.640 |
| AE | 0.125 radius |
| AF | 0.060 radius |
| AG | 1.312 diameter |
| AH | 1.476 |
| AI | 1.253 |
| AJ | 1.641 |
| AK | 1.184 |
| AL | 1.808 |
| AM | 1.116 |
| AN | 1.206 |
| AO | 1.898 |
| AP | 1.169 |
| AQ | 1.328 radius |
| AR | 1.978 |
| AS | 0.157 |
| AT | 0.697 |
| AU | 0.134 |
| AV | 1.000 radius |
| AW | 0.172 radius |
| AX | 0.157 |
| AY | 0.076 |
| AZ | 0.046 |
| BA | 0.282 |
| BB | 0.021 |
| BC | 1.390 diameter |
| BD | 0.188 radius |
| BE | 0.250 radius |
| BF | 0.090 radius |
| BG | 0.625 radius |
| BH | 0.125 |
| BI | 0.563 |
| BJ | 0.697 |

It should be noted that the size of the vane 106 is not critical provided that the vane extends radially inward to direct contaminants into the through-flow stream.

In summary, the fluid conduit of the present invention provides a uniform optimal flow of increasing velocity into the inducer inlet. This flow acceleration is accomplished by providing a converging passage including an outlet having a cross-sectional area which is a specified percentage of the inlet cross-sectional area. The flow passage member 34 has a uniformly increasing cross-sectional area. If necessary or desirable, the member 34 may instead provide a converging passage wherein the cross-sectional area smoothly and continuously decreases, if the inlet port 44 of the member 34 must be larger than the inlet of the chamber 52.

A substantial axial component of fluid flow is introduced by the surface 86 and streamlining around the fuel control drive shaft 126 is provided by the upstanding arcuate projection 130. Fuel containing contaminants is directed from a non-through-flow stream into a through-flow stream by the vane 106.

The geometry of the fluid conduit is such as to minimize head loss and regions of low pressure conducive to the generation of two-phase flow. Cavitation on the walls of the inlet cavity, head loss and unsteady flow patterns are reduced and two-phase flow capability is increased.

Further modifications and alternative embodiments in the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims as reserved.

What is claimed is:

1. An improvement in a fluid supply chamber for a fluid utilization device wherein fluid is to be delivered to the device generally in a first direction, and wherein the chamber includes an inlet port at which fluid flow is established in a second direction transverse to the first direction and an outlet port, the flow of fluid being divided into a through-flow stream and a non-through-flow stream adjacent the outlet port, the improvement comprising:

inner walls defining a converging flow passage disposed between the inlet port and the outlet port of the chamber, the flow passage having a transition portion at which a component of flow in the first direction is imparted to the fluid; and a vane adjacent the outlet port of the chamber that directs fluid from the non-through-flow stream into the through-flow stream.

2. The improvement of claim 1, wherein the flow passage exhibits a convergence which is substantially uniform per unit meridional length.

3. The improvement of claim 1, wherein the transition portion includes an inner wall surface of continuous curvature which directs the flow of fluid towards the fluid utilization device.

4. The improvement of claim 1, wherein the fluid utilization device includes a shaft extending in the first direction through the chamber and a bore in a chamber wall and wherein the chamber further includes an upstanding arcuate projection extending into the chamber and surrounding the bore.

5. A fluid supply conduit for a fluid utilization device wherein the device includes an inlet into which fluid is to be delivered generally in an axial direction, comprising:

an inlet flow passage member having first and second ends and inner walls defining a first, diverging passage from the first end to the second end, the member directing fluid flow at the second end in a direction transverse to the axial direction; and a fluid supply chamber disposed between the second end of the member and the inlet of the utilization device and allowing fluid flow therebetween, the fluid supply chamber including inner walls defining a second, converging passage from the second end of the member to the utilization device.

6. The fluid supply conduit of claim 5, wherein the second passage is of a certain length and converges in a substantially uniform manner over such length.

7. The fluid supply conduit of claim 5, wherein the fluid supply chamber includes an inner wall surface of continuous curvature which directs the flow of fluid towards the fluid utilization device.

8. The fluid supply conduit of claim 5, wherein the fluid utilization device includes a shaft extending axially through the chamber and a bore in a chamber wall and wherein the chamber further includes an upstanding arcuate projection extending into the chamber and surrounding the bore.

9. The fluid supply conduit of claim 5, wherein the chamber includes an outlet port and the fluid flow in the chamber is divided into a through-flow stream and a non-through-flow stream adjacent the outlet port and wherein contaminants are disposed in the fluid and further including a vane adjacent the outlet port of the chamber that directs contaminants from the non-through-flow stream into the through-flow stream.

10. The fluid supply conduit of claim 5, wherein the first passage diverges in a substantially uniform manner over a portion of the length of the inlet flow passage member.

11. The fluid supply conduit of claim 5, wherein the first passage has a substantially circular cross-sectional shape at the first end thereof and a substantially elliptical cross-sectional shape at the second end thereof.

12. The fluid supply conduit of claim 5, wherein the chamber includes an inlet port having a first cross-sectional area and an outlet port having a second cross-sectional area which is less than the first cross-sectional area.

13. A fuel supply conduit for an aircraft fuel pump wherein the pump includes an inducer inlet through which fluid is to be delivered generally in an axial direction and wherein the inducer inlet is spaced from an obstruction by a certain axial distance comprising:

an inlet flow passage member having first and second ends and an inner wall defining a first, diverging passage from the first end to the second end, the member directing fuel flow at the first end substantially 180 degrees opposite to the axial direction and directing fuel flow at the second end in a direction transverse to the axial direction, the member having an outer axial dimension at the second end substantially equal to the certain axial distance; and a fuel supply chamber disposed between the second end of the member and the inducer inlet of the fuel pump and allowing fuel flow from the member to the fuel pump, the fuel supply chamber including inner walls defining a second, converging passage from the second end of the member to the fuel pump.

14. The fuel supply conduit of claim 13, wherein the second passage is of a certain length and converges in a substantially uniform manner over such length.

15. The fuel supply conduit of claim 14, wherein the fuel supply chamber includes an inner wall surface of continuous curvature which directs fuel flow towards the inducer inlet.

16. The fuel supply conduit of claim 15, wherein the chamber includes an outlet port and the fuel flow in the chamber is divided into a through-flow stream and a non-through-flow stream adjacent the outlet port and wherein contaminants are disposed in the fuel and further including a vane adjacent the outlet port of the chamber that directs contaminants from the non-through-flow stream into the through-flow stream.

17. The fuel supply conduit of claim 16, wherein the first passage diverges in a substantially uniform manner over a portion of the length of the inlet flow passage member.

18. The fuel supply conduit of claim 17, wherein the first passage has a substantially circular cross-sectional shape at the first end thereof and a substantially elliptical cross-sectional shape at the second end thereof.

19. The fuel supply conduit of claim 18, wherein the chamber includes an inlet port having a first cross-sectional area and the outlet port has a second cross-sectional area which is less than of the first cross-sectional area.

20. The fuel supply conduit of claim 19, wherein the fuel pump includes a shaft extending axially through the chamber and a bore in a chamber wall and wherein the chamber further includes an upstanding arcuate projection extending into the chamber and surrounding the bore.

* * * * *